J. F. TANNEHILL.
Seed Planter.
No. 29,636.
Patented Aug. 14, 1860.
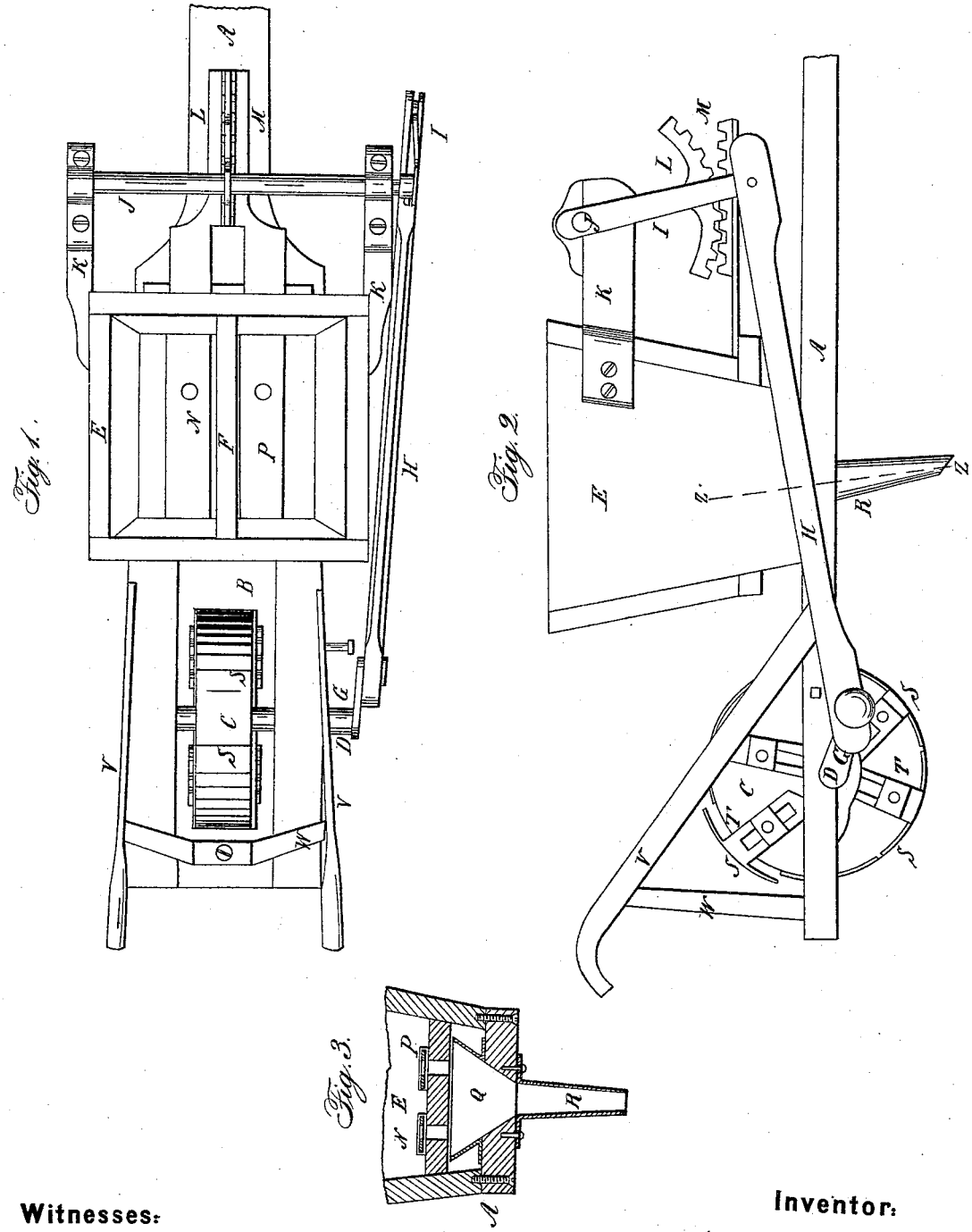
Witnesses:
C. B. Stewart
Geo. H. Clarke
Inventor:
Joseph F. Tannehill
By his Atty. J. Dennis

UNITED STATES PATENT OFFICE.

JOSEPH F. TANNEHILL, OF STAUNTON, VIRGINIA.

IMPROVEMENT IN SEED-PLANTERS.

Specification forming part of Letters Patent No. 29,636, dated August 14, 1860.

*To all whom it may concern:*

Be it known that I, Jos. F. TANNEHILL, of Staunton, in the county of Augusta and State of Virginia, have invented a new and useful Improvement in Seed-Planters; and I do hereby declare that the same is described and represented in the following specification and drawings.

To enable others skilled in the art to make and use my improvement, I will proceed to describe its construction and operation, referring to the drawings, in which the same letters indicate like parts in each of the figures.

Figure 1 is a plan or top view of a seed-planter with my improvements. Fig. 2 is a side elevation of the same. Fig. 3 is a section of the lower part of the seed on the line $z\ z$, Fig. 2.

The nature of my invention and improvement in seed-planters consists in a carrying and driving wheel (to operate the seed-delivering apparatus) provided with segments and radial arms for varying its circumference, so as to vary the space between the hills or deposits of seed.

In the accompanying drawings, A is the beam, made in the form shown, or in such other form as will answer the purpose, and may have a clevis fastened to the end for the draft-chain.

B is a slot cut in the beam for the wheel C to turn in, which wheel is fastened to the shaft D, which is arranged to turn in boxes fastened to the under side of the beam.

E is a seed-box fastened to the top of the beam and divided by the partition F, so as to carry seed and guano or other fertilizer at the same time.

G is a crank on the end of the shaft D, carried by the wheel C, to traverse the link H and vibrate the arm I on the rock-shaft J, which turns in the boxes K K, fastened to the seed-box E, as shown in the drawings. The rock-shaft J carries the arm and segment of teeth L, which work into the rack M and traverse the delivering-slides N and P in the seed-box, which slides are fitted to traverse on the bottom of the seed-box, and are perforated, so as to deliver the seed and fertilizer into the opening in the bottom of the seed-box and let them fall into the tunnel Q, which conducts the seed and fertilizer into the tube R, fastened to the under side of the beam A, through which tube they fall to the ground.

In order to vary the distance between the deposits of seed or hills planted, I make a sufficient number of segments, S S, to surround the wheel C, which segments are provided with radial arms T T, secured to the wheel C by bolts passing through slots in the arms, so that the diameter of the wheel may be increased by setting the segments out from the center of the wheel, so as to increase its marking-circumference and enlarge the space between the deposits or hills of seed planted. It will be apparent that by changing the position of the segments the space or distance between the hills of seed may be varied.

V V are handles fastened to the beam A and supported by the brace W, as shown in the drawings. Whenever it is desirable to stop the slides which deliver the seed, &c., the link may be raised from the crank and hooked onto a pin in the beam.

My improvements make a simple, cheap, and durable seed-planter, that is not so liable to get out of order as those which are more complicated.

I believe I have described and represented the improvements which I have made in seed-planters so as to enable any person skilled in the art to make and use them.

I will now state what I desire to secure by Letters Patent, to wit:

A driving and carrying wheel provided with segments, having radial arms for varying its circumference, in combination with a seed-delivering apparatus, substantially such as herein described, or its equivalent.

JOSEPH F. TANNEHILL.

Witnesses:
WM. J. HUNTER,
J. J. POINTS.